Figure 1:
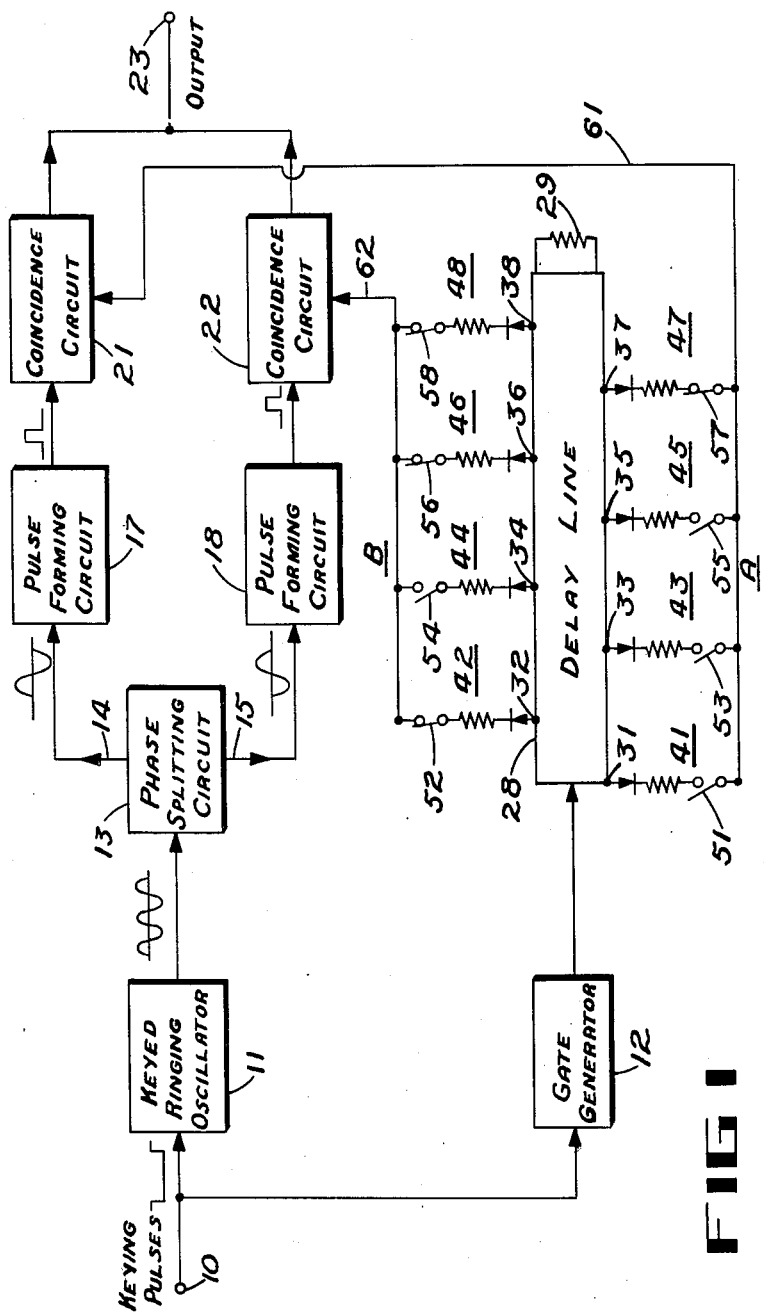

Feb. 28, 1961   J. B. MAJERUS ET AL   2,973,509
PULSE CODING SYSTEM
Filed Jan. 11, 1957   2 Sheets-Sheet 1

INVENTORS
JOHN B. MAJERUS
ARTHUR H. WULFSBERG
BY
Moody and Goldman
ATTORNEYS

United States Patent Office 2,973,509
Patented Feb. 28, 1961

2,973,509

PULSE CODING SYSTEM

John Bruce Majerus and Arthur H. Wulfsberg, Cedar Rapids, Iowa, assignors to Collins Radio Company, Cedar Rapids, Iowa, a corporation of Iowa Filed Jan. 11, 1957, Ser. No. 633,575

6 Claims. (Cl. 340—345)

This invention relates generally to pulse-forming circuits wherein a sequence of pulses are formed according to a binary code.

Oftentimes, it is essential that an aircraft be recognized when it cannot be seen, such as, for example, during bad weather conditions. This can be done by having each aircraft transmit a recognition signal; and such a signal must be different for each aircraft in a vicinity.

A binary-pulse code is a convenient way of providing such a recognition signal. Such a code, for example, can use a sequence of N number of pulses spaced by time intervals P. Binary coding is obtained by combining the deletion of pulses from the sequence of N pulses, and assigning different combinations to the respective aircraft in the vicinity. There are a maximum of $2^N$ combinations for the N pulses in each sequence. Thus, where six pulses are provided in the sequence, there are a maximum of 64 combinations which can distinguish up to that many aircraft in a given vicinity.

Such coding device may be provided in a pulse transmitter-receiver arrangement known as a transponder. When such a transponder is triggered by an interrogating signal transmitted from a ground station or from other aircraft, it responds with its assigned code.

There are known circuits for coding pulses in this manner. Such circuits generally require a delay line as a component. When the number of pulses in a sequence is large, the delay-line component must provide substantial delay time and must have a substantially high cut-off frequency to enable pulses in the sequence to be distinguished from each other. The delay line is among the bulkier of components in such coding circuits.

It is, therefore, an object of this invention to provide a binary-coding circuit which permits a delay-line component having a substantially smaller size than in prior binary-coding circuits, wherein the invention enables a coding circuit having less over-all size and weight than prior coding circuits.

It is another object of this invention to provide a binary-coding circuit that includes a delay-line component having a lower-cutoff frequency than prior coding circuits, without decreasing the ability of the circuit to distinguish between pulses in a sequence.

It is another object of this invention to provide a pulse-coding circuit in which the frequency of a ringing-oscillator component is a fraction of that required in prior coding circuits for providing a given binary-code pulse sequence. A decrease in the required frequency of the ringing-circuit component is usually desirable; because for practical reasons, greater frequency stability is achieved at lower frequencies.

The invention utilizes a ringing oscillator which is keyed by input pulses received from an external source. Pulse-generating means receives the ringing-oscillator frequency and generates plural sets of pulses respectively having repetition rates equal to the ringing-oscillator frequency. However, the pulses of the plural sets sequentially repeat with respect to each other. A plurality of coincidence circuits each have one input receiving a different one of the sets of pulses.

A gate generator also receives the input keying pulses and generates gating pulses that occur respectively at the initiation of the keying pulses. A delay line receives the gating pulses and has tap points at uniform delay-time intervals P. A plurality of series circuits are provided, being N in number, each comprising a diode, resistor and single-pole switch connected in series. These series circuits are respectively connected to the tap points of the delay line. The diodes are all polarized in the same way with respect to the delay line to provide isolation between tap points when connected by closed switches. The series circuits are divided into plural groups, equal in number to the plural sets of pulses. The remaining ends of the series circuits in each group are connected in common; and each common connection is connected to the other input of a different one of the coincidence circuits. The outputs of all of the coincidence circuits are connected in common to the output terminal of the system. Binary coding is obtained by setting the switches of the respective series circuits in open or closed positions with combined variation, whereby the switch in each series circuit controls the "off" or "on" state of a respective pulse in the sequence of N pulses.

Figure 2:
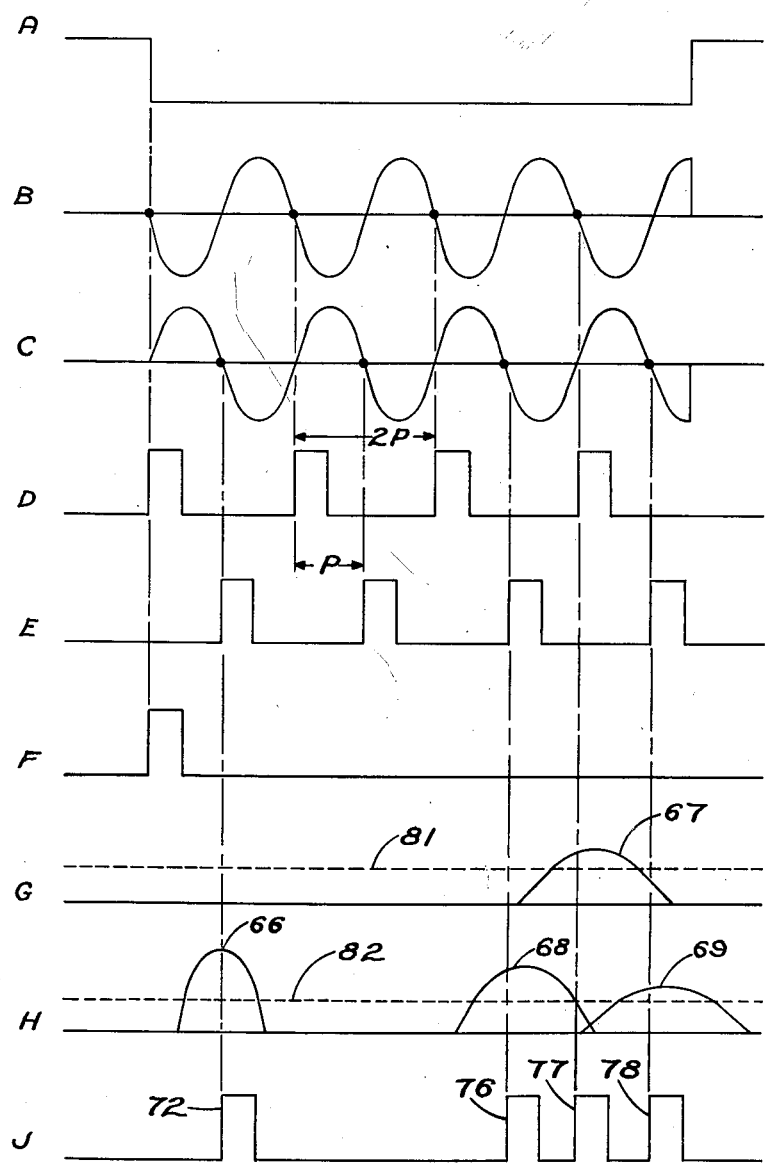

Further objects, features and advantages of this invention will be apparent to a person skilled in the art upon further study of the specification and drawings, in which:

Figure 1 is a blocked diagram of an illustrative form of the invention; and,

Figures 2A, B, C, D, E, F, G, H and J are wave forms used in explaining the operation of the invention.

Figure 1 illustrates a form of the invention that can be used in an airborne transponder to send out a predetermined binary identification code, comprised of a particular on-off combination of eight equally-spaced pulses. The transponder can, for example, send out one set of coded pulses for each interrogation pulse received by it. The interrogation pulses are detected, amplified and reshaped by receiving means not a part of this invention to provide keying pulses. The keying pulses are received at an input terminal 10 and have a duration equal to or slightly greater than the coded pulse sequence. A keying pulse is illustrated in Figure 2A.

A keyed ringing oscillator 11 and a gate generator 12 have their inputs connected to terminal 10. Ringing oscillator 11 is normally off and is turned on for the duration of each keying pulse. Ringing oscillator 11 is shock excited by the leading edge of each keying pulse and oscillates for its duration at the oscillator's tuned frequency, which is chosen to be equal to one-half the repetition rate required for pulses in the coded sequence.

There is a fixed phase between the shock excited wave and the leading edge of the keying pulse. Accordingly, when the trailing edge of the keying pulse shuts off the oscillator output, the number of cycles provided at the output of ringing oscillator 11 equals at least one-half the number of pulses in the coded sequence, which is four cycles for the code sequence of eight pulses. More cycles do not hinder operation of the invention. The period of each cycle of output from oscillator 11 is 2P.

Ringing oscillator 11 can comprise an amplifier tube that has a parallel-resonant circuit connected to its plate. The amplifier is made normally conducting, and keying pulses having a negative amplitude drive the amplifier tube into a non-conducting high-impedance state. A circuit for ringing oscillator 11 is given in "Principles of Radar" by the M.I.T. School Staff, second edition, 1946, page 2–70. The leading edge of each keying pulse shock excites the tank circuit into oscillation at its tuned frequency, which lasts until the trailing edge of the keying pulse, which again causes a low tube impedance that shunts the parallel-resonant circuit and quickly damps out the oscillation.

Furthermore, the leading edge of each keying pulse actuates gate generator 12 to provide a pulse, such as shown in Figure 2F. Gate generator 12 can be a blocking oscillator. A circuit for it is explained on pages 2–82 through 2–88 of "Principles of Radar," cited above.

The cycles of output from ringing oscillator 11 are provided to a phase-splitting circuit 13, which also acts as a buffer. Circuit 13 may be any of the phase inverters shown on page 302 of "Radio Engineering," third edition, 1947, by F. E. Terman. It may be a cathodyne type of phase-inverting circuit, for example. Phase splitter 13 provides two outputs 14 and 15 which have a 180-degree phase relationship with each other. Figures 2B and 2C illustrate the opposite phase outputs of phase-splitting circuit 13, each including the four cycles per keying pulse.

A pair of pulse-forming circuits 17 and 18 respectively receive the outputs of phase-splitting circuit 13 and generate pulses from their sine-wave inputs at the same point in each cycle of the sine wave, such as the point where a wave goes positive. Circuits 17 and 18 can be differentiating circuits. Figure 2D illustrates the pulses provided at the output of circuit 17 when the wave of Figure 2B is received; and Figure 2E illustrates the pulses provided at the output of second circuit 18 when the opposite-phased wave of Figure 2C is received. Note that the pulses of Figures 2D and E are interleaved in time. That is, the pulses of wave 2D occur alternately with respect to the pulses of wave 2E. Hence, the pulses from the output of each pulse-generator have periods of 2P; however, the time occurring between alternate pulses from both pulse generators is P.

A pair of coincidence circuits 21 and 22 have their inputs respectively connected to the outputs of pulse-forming circuits 17 and 18. The outputs of the coincidence circuits are connected in common to an output terminal 23. Coincidence circuits in general provide an output pulse only when two inputs are received simultaneously. Thus, the inputs provided to coincidence circuits 21 and 22 from the respective pulse-forming circuits are alone insufficient to provide an output from the coincidence circuits.

A delay line 28 is connected to the output of gate generator 12. Line 28 may be any type of delay line such as an artificial transmission line or a uniform line having a permeable-dielectric medium. Such delay lines and their cut-off frequencies are described on pages 2–88 and 2–89 of "Principles of Radar," cited above. A resistor 29 properly terminates delay line 28 to prevent reflections from that end of the line.

A plurality of tap points 31 through 38 are provided along the delay line and are consecutively spaced to obtain uniform amounts of delay time P. Thus, the time delay between adjacent tap points (for example, between points 31 and 32) is substantially equal to one-half the period of one cycle at the output of ringing oscillator 11.

A plurality of series circuits 41 through 48, each comprising a diode, resistor, and single-pole switch, are connected respectively to tap points 31 through 38, wherein the anodes of the respective diodes connect to the tap points. The series circuits are divided into two groups A and B. Group A comprises series circuits 41, 43, 45 and 47, which are interleaved along the delay line with series circuits 42, 44, 46 and 48 that comprise group B.

The opposite ends of the series circuits of group A are connected in common by a lead 61 to the second input of coincidence circuit 21.

The remaining ends of the series circuits of group B are connected in common by a lead 62 to the second input to coincidence circuit 22.

The number of pulses in the coded sequence is equal to the number of series circuits; and each series circuit provides a given pulse in the sequence. Thus, the eight series circuits shown in Figure 1 enable an eight pulse sequence. Each switch controls the off-on state of the pulse in the sequence provided by its series circuit. Series circuits 41 through 48 include switches 51 through 58, respectively. Thus, switch 51 controls the state of the first pulse in the sequence, switch 52 controls the state of the second pulse, and so on with switch 58 controlling the state of the last pulse. When a switch is closed, its controlled pulse appears in the sequence; and when a switch is open, its controlled pulse does not appear in its assigned position in the sequence.

Accordingly, if the assigned pulse sequence is that shown in Figure 2J, which includes the second, sixth, seventh and eighth pulses in the sequence, switches 52, 56, 57 and 58 are closed. When a keying pulse is received, it will simultaneously key ringing oscillator 11 and actuate gate generator 12. As a result of ringing-oscillator action, phase-splitting circuit 13, and pulse-forming circuits 17 and 18 respectively provide the pulses shown in Figures 2D and 2E to their respective inputs of coincidence circuits 21 and 22. Furthermore, the gate pulse shown in Figure 2F, provided at the output of gate generator 12, is propagated down relay line 28. Due to the relatively low cutoff frequency of delay line 28, the higher harmonic content of the gate-generator pulse is attenuated; and as the pulse propagates further down the line, its amplitude decreases and it becomes more rounded, as illustrated by pulses 66 and 68 and 69 in Figure 2H.

Since the taps on the delay line are spaced at uniform time-delay intervals P, which, for example, may be 2.9 microseconds, the propagated pulse passes by respective tap points 31 through 38 at times spaced by interval P. When the pulse passes first tap point 31, it does not provide any input to coincidence circuit 21 because first switch 51 is open. Accordingly, the first pulse in Figure 2D received by circuit 21 does not cause an output to terminal 23. As the pulse passes second tap point 32, the pulse voltage appears at the second input of its coincidence circuit, since switch 52 is closed. Therefore, delay-line pulse 66 is provided by the closed series-circuit 42 to one input of coincidence circuit 22 at the same time that it receives the first pulse from pulse-forming circuit 18 shown in Figure 2E. An output pulse 72 in Figure 2J is provided at that instant from coincidence circuit 22.

As the delay-line pulse passes terminals 33, 34 and 35, the coincidence circuits are not affected because the switches in the respective series circuits connected to those terminals are open. The second and third pulses in Figure 2D and the second pulse in Figure 2E, therefore, do not cause any output from the coincidence circuits.

As the delay-line wave passes the sixth, seventh and eighth terminals (36, 37 and 38) it is received respectively by the coincidence circuits to enable the fourth pulse in Figure 2D and the third and fourth pulses in Figure 2E to provide the sixth, seventh and eighth output pulses 76, 77 and 78 in the sequence shown in Figure 2J.

The rounded pulses shown in Figures 2G and H illustrate the actuation at each second terminal of the coincidence circuits. Lines 81 and 82 represent the actuating voltage level required at the second input to the respective coincidence circuits 21 and 22. Note how the rounded pulses rise above the actuating voltage level when respective switches are closed to coincide with certain of the pulses received by the coincidence circuits from the pulse-forming circuits.

The diodes in the series circuits isolate the other tapped points of the delay line from an output being provided by another tap point when the series-circuit switches are closed between the respective tap points, thus preventing an undesired feedback of pulses into the line. In other words, the undirectional properties of the diodes permit pulses to pass from the delay line to the coincidence circuits, but prevent the pulses from being received back into the delay line through them.

As a matter of practice, the size of a delay line is related to its cutoff frequency. As a rule of thumb, it may be stated that the volume occupied by a delay line of a given type is decreased by one-half when the cutoff frequency of the delay line is decreased by the same amount. To a degree, this may be shown mathematically in regard to an artificial-transmission line by the following expression:

$$\bar{T} = \frac{1}{\pi f_0} \quad (1)$$

where T is the delay-per-section of line, and $f_c$ is the cutoff frequency of the line. Accordingly, when the cutoff frequency is reduced by one-half, the delay-per-section T is doubled. Hence, for two lines having a given amount of delay, only half the number of sections is required when cutoff frequency is reduced by one-half.

It is to be realized that the cutoff frequency requirements of the delay line can be further reduced using the principles taught by this invention. Thus, more generically, the cutoff frequency can be reduced to 1/$S$ of that in a conventional coding circuit. This requires a phase-splitting circuit providing S number of outputs spaced respectively phase-wise by 360/$S$ degrees, with S number of pulse-forming circuits connected respectively ot the phase-splitting circuit outputs, and with S number of coincidence circuits. Furthermore, the N number of series circuits are divided into K number of consecutive groups with S number of series circuits in each group. The second input to each coincidence circuit is connected to a given one of the consecutive series circuits in each group, thus connecting K number of series circuits to each coincidence circuit. N, K and S are integers not including zero or one. It can be seen that this generalization applies to Figure 2, wherein N is 8, K is 4, and S is 2.

Although this invention has been described with respect to particular embodiments thereof, it is not to be so limited as changes and modifications may be made therein which are within the full intended scope of the invention as defined by the appended claims.

We claim:

1. A pulse-coding circuit having an input terminal connected to a source of keying pulses, comprising a keyed-ringing oscillator, and a gate generator, each having their inputs connected to said input terminal, phase-splitting means connected to the output of said ringing circuit to provide opposite-phased outputs at the frequency of said ringing circuit, first and second pulse forming devices respectively connected to the outputs of said phase-splitting means, first and second coincidence circuits, each having first and second inputs, the first input of each coincidence circuit connected respectively to the outputs of said pulse forming devices, a delay line having its input connected to the output of said gate generator, a plurality of series circuits, each including an asymmetric conductor, and switching means, said series circuits having ends connected consecutively to points along said delay line spaced by given delay intervals, the other ends of alternate ones of said series circuits being connected to the second inputs of one of said coincidence circuits, and the other ends of the remaining series circuits being connected to the second input of the other of said coincidence circuits, and an output terminal connected to the outputs of both of said coincidence circuits.

2. A pulse-coding circuit comprising an input terminal, a keyed-ringing oscillator being connected to said input terminal, a gate-pulse generator also being connected to said input terminal, a delay line being connected to said gate generator, a plurality of series circuits, each having one end connected to said delay line at points spaced by substantially equal delay inputs, each of said series circuits comprising a diode, a resistor, and a normally-open switch, there being S number of pairs of said series circuits consecutively provided along said delay line, phase-splitting means connected to the output of said ringing oscillator to provide two outputs spaced by 180° of phase in response to said ringing oscillator, a pair of pulse-forming circuits having their inputs respectively connected to the outputs of said phase-splitting circuit, first and second coincidence circuits, each having one input respectively connected to the outputs of said pulse-forming circuits, the other input to said first coincidence circuit being connected to the other end of the first series circuit in each of said pairs of series circuits, the other input to the second coincidence circuit being connected to the other end of the other series circuit in each of said pairs, an output terminal connected to the outputs of all of said coincidence circuits to provide the output of said pulse-coding generator, whereby different codes are provided by combining the closing combination of the switches in said series circuits.

3. Pulse-coding means operated by a source of keying pulses, comprising an input terminal connected to said source of keying pulses, keyed-ringing means connected to said input terminal, gate-pulse generating means also connected to said input terminal to provide a pulse at the initiation of each keying pulse, delay-line means having its input connected to the output of said gate-pulse generating means, a plurality of series circuits, each series circuit including asymmetric conduction means, and switching means, said series circuits each having one of their ends consecutively connected along said delay-line means at substantially equally spaced delay intervals, phase-splitting means having its input connected to the output of said keyed-ringing means, said phase-splitting means having S number of outputs with S being other than zero or one, with each output having a phase that is a different integer multiple of 360°/$S$, S number of pulse-forming circuits, each having its input connected to a different one of the outputs of said phase-splitting means, S number of coincidence circuits, each having one input respectively connected to the output of a different one of said pulse-forming circuits, said series circuits being consecutively grouped along said delay-line means into K number of groups, with each group having S number of series circuits, the first series circuit in each group having its other end connected to the other input of one of said coincidence circuits, the second series circuit in each group having its end connected to the other input of another of said coincidence circuits, and the outputs of said coincidence circuits connected in common to provide the output of said pulse-coding means.

4. Pulse-coding means comprising a source of keying pulses, a keyed-ringing oscillator having its input connected to said source, a gate generator having its input also connected to said source, a delay line having its input connected to the output of said gate generator, a plurality of series circuits, each having one end connected to said delay line, said connections being at consecutive points spaced by substantially equal delay intervals, each of said series circuits comprising asymmetric-conduction means, and switching means, said series circuits being divided into K number of consecutive groups, each group including S number of series circuits, phase-shifting means having its input connected to the output of said keyed-ringing oscillator, with said phase-shifting means providing S number of outputs, with its outputs being substantially spaced by phase intervals of 360°/$S$, S number of pulse-forming circuits, each having its input connected to a different output of said phase-shifting circuit, S number of coincidence circuits, each having one input connected to the output of a different one of said pulse-forming circuits, the other input to each of said coincidence circuits being connected to the other end of one series circuit in each of said K number of groups, with the series circuits connected to any one of said coincidence circuits having the same consecutive relationship in each of said groups, and the combined output of said coincidence circuits providing the output of said pulse coding means.

5. A pulse-coding circuit comprising an input terminal for receiving keying pulses, a keyed-ringing oscillator having its input connected to said terminal, a gate-generator also having its input connected to said terminal, a delay line having its input connected to the output of said gate generator, N number of series circuits, each having one end connected consecutively to said delay line at substantially equal delay intervals, each of said series circuits comprising asymmetric conduction means, and switching means, said series circuits being segregated into K number of consecutive groups along said delay line, each of said groups containing two series circuits, phase-shifting means having its input connected to said keyed-ringing oscillator, said phase-shifting means providing two outputs having a phase difference of 180°, a pair of pulse-forming circuits having their inputs respectively connected to the outputs of said phase-shifting circuit, first and second coincidence circuits, the first inputs to said coincidence circuits respectively connected to the outputs of said pulse-forming circuits, the second input to said first coincidence circuit being connected to the other end of the first series circuit in each of said groups, the second input to said second coincidence circuit being connected to the other end of the second series circuit in each of said groups, the asymmetric conduction means in each of said series circuits being polarized in the same manner with respect to said delay line, and an output terminal connected to the output of each of said coincidence circuits.

6. A pulse-coding circuit as defined in claim 4 in which there are four groups.

References Cited in the file of this patent
UNITED STATES PATENTS

| | | |
|---|---|---|
| 2,403,561 | Smith | July 9, 1946 |
| 2,577,141 | Mauchly | Dec. 4, 1951 |
| 2,610,243 | Burkhart | Sept. 9, 1952 |
| 2,686,261 | Toulon | Aug. 10, 1954 |
| 2,710,958 | Sallach | June 14, 1955 |